UNITED STATES PATENT OFFICE.

SPENCER B. NEWBERRY AND HARVEY N. BARRETT, OF BAYBRIDGE, OHIO.

PROCESS OF MAKING FERTILIZER.

1,032,763.

Specification of Letters Patent. Patented July 16, 1912.

No Drawing.

Application filed October 10, 1910. Serial No. 586,178.

*To all whom it may concern:*

Be it known that we, SPENCER B. NEWBERRY and HARVEY N. BARRETT, citizens of the United States, residing at Baybridge, Erie county, Ohio, have invented certain new and useful Improvements in Processes of Making Fertilizers, of which the following is a specification.

Our invention relates to the treatment of natural phosphates,—by which we mean phosphate rock consisting chiefly of phosphate of lime, or apatite or bone phosphate, by a simple and inexpensive process by which the insoluble phosphates are brought into citrate-soluble condition and thus rendered available for the support of plant growth. This we accomplish by calcining the natural phosphates with carbon or carbonaceous matter, under certain conditions and by observing certain precautions which we find essential to economical manufacture and maximum solubility and efficiency of product.

In the course of our experiments we have found that simple heating with carbon, even with a large proportion of carbon and at very high temperature, is ineffective in rendering all or even most of the phosphate citrate-soluble. The effect of heating with carbon appears to be to reduce the phosphates to phosphites, hypophosphites, or even to phosphids, depending on the amount of carbon, the temperature, and the duration of the heating, and these products are largely insoluble in ammonium citrate. We find that this condition can be remedied and a product obtained in which substantially all the phosphoric acid is in citrate-soluble form, by following the heating with carbon by heating in an oxidizing atmosphere at high temperature, probably 2500° to 2800° F., until the carbon is consumed and the phosphorus compounds are re-oxidized to phosphates. If the operation is conducted in this manner, only a small proportion of carbon is required, amounting to 15 to 25 per cent. of the natural phosphate treated. We do not, however, intend to confine ourselves to this proportion, as excess of carbon over the amount strictly required does not appear to be injurious, except in respect of economy, and good results may be obtained with a larger, and probably in some cases even with a smaller proportion of carbon than that stated.

In place of carbon, any carbonaceous fuel, as coal, coke, charcoal, wood, sawdust, peat, oil or tar may be used, or in fact any form of organic or mineral carbonaceous matter capable of exercising a reducing or deoxidizing action under the influence of heat. These materials are to be intimately mixed with the natural phosphate by ordinary processes of mixing and grinding, and the mixture submitted to heat in the manner described, the heating being continued in an oxidizing atmosphere until the carbonaceous matter is consumed and the residue re-oxidized and brought to a condition of maximum citrate-solubility. A similar effect may be produced without addition of carbonaceous matter, by submitting the pulverized phosphate to heat in contact with reducing gases, such as coal-gas, water-gas, natural gas, producer gas, etc., followed by heating in an oxidizing atmosphere as described.

The two successive effects of reduction and oxidation may be produced in a single operation, by heating the mixed phosphate and carbonaceous matter in a continuous kiln or furnace so operated that the material is first subjected to a moderate and increasing heat, by which the reduction is effected by the carbonaceous matter present, and during the final stage of the calcination is exposed to high temperature in an oxidizing atmosphere. The simplest form of furnace for this purpose is probably the revolving, internally-fired kiln commonly used in the calcining of Portland cement. Similar conditions would however prevail, with similar results, in a vertical continuous kiln such as is used in burning lime, or in a blast-furnace as used in the smelting of iron, and we intend our invention to include the use of kilns or furnaces of any type, in which the effect of calcination in an oxidizing atmosphere can be produced.

As an example of the practical working of our process, we take phosphate rock and coal in suitable proportions, for example 100 parts rock and 25 parts coal, and reduce these materials to a fine state of division by wet or dry grinding, together or separately with subsequent mixing. We then introduce the mixture into the upper end of a revolving cylindrical kiln similar to a cement-kiln, heated internally by a flame of coal-dust, gas or oil. The feed of raw material and of fuel are so adjusted that the change in its descent through the kiln, shall be gradually raised to a red heat, and finally, in the lower part of the kiln, to an orange or nearly white heat. The adjustment differs from that of cement burning in the smaller amount of fuel and relatively greater amount of air supplied at the discharge end of the kiln, since the combustion of the coal contained in the charge furnishes most of the heat required, and it is essential that enough air be admitted to insure the complete combustion of this coal some time before the calcined product is discharged.

Owing to the fuel in the raw mixture, the atmosphere at the upper end of the kiln is of a reducing character, while in the lower part, owing to excess of air admitted, it is strongly oxidizing. The product is discharged through a revolving cooler which cools the material and at the same time heats the entering air to high temperature, as is the usual practice in cement burning. It will doubtless be found possible, by admixture of sufficient coal with the raw material and strong pre-heating of the air admitted, to dispense with all fuel at the lower end of the kiln.

The passage of a given portion of the charge through the kiln requires usually from one to two hours, according to dimensions of apparatus and speed of revolution. During the first part of this time the material is moderately heated under reducing conditions; the volatile matter of the coal is expelled, the carbon gradually consumed, and the phosphates reduced to a lower stage of oxidation. In the latter part of the calcination the temperature reaches an orange heat, the last of the admixed fuel is burned away, and a strong oxidizing action takes place by which the reduced compounds are reconverted into phosphates and rendered citrate-soluble. The calcined product is finally ground to powder and is then ready for use as fertilizer or as an ingredient of commercial fertilizers.

It will be understood, of course, that the foregoing description and explanation may be taken, in some particulars at least, as more or less tentative and capable of revision, expansion and further explanation. In processes involving chemical action, it not infrequently occurs that the whole significance of any given process or step therein is not apparent at the beginning; and we reserve the right to submit further explanatory matter touching the description and the claims. It is equally difficult to set out distinctly the essence of such invention in the claims; but, as we now understand the matter, we desire to claim the following.

Claims:

1. The process of rendering insoluble phosphates citrate-soluble by calcining them with carbon until the carbon is consumed, and calcining them further in an oxidizing atmosphere at nearly white heat.

2. The process of rendering insoluble phosphates citrate-soluble by calcining them with carbonaceous matter until the carbonaceous matter is consumed, and calcining them further in an oxidizing atmosphere at nearly white heat.

3. The process of rendering insoluble phosphates citrate-soluble by reducing them and then oxidizing them.

4. In making fertilizer, the process of rendering insoluble phosphates citrate-soluble by heating the phosphates with canbonaceous matter until the carbonaceous matter is substantially consumed and calcining them further in an oxidizing atmosphere until the products of reduction are re-oxidized.

5. The process of rendering insoluble phosphates citrate-soluble by reducing them to a lower degree of oxidation by heating with carbonaceous matter and re-oxidizing the reduced products to phosphates by calcining them further in an oxidizing atmosphere at nearly white heat.

6. The process of rendering insoluble phosphates citrate-soluble by heating the phosphates in contact with reducing gases and re-oxidizing the reduced products so formed.

7. The process of making fertilizer by grinding natural phosphates to powder, mixing the ground phosphates with carbonaceous matter, and calcining the mixture in an oxidizing atmosphere at a temperature of 2500° to 2800° F. until the carbonaceous matter is substantially consumed and the products of reduction of the phosphates are re-oxidized.

In testimony whereof we affix our signatures in the presence of two witnesses.

SPENCER B. NEWBERRY.
HARVEY N. BARRETT.

Witnesses:
HARVEY R. DURBIN,
JAY PRINTY.